US006670953B1

(12) United States Patent
Ozawa (10) Patent No.: US 6,670,953 B1
(45) Date of Patent: Dec. 30, 2003

(54) ELECTRO-OPTICAL DEVICE SUBSTRATE, ACTIVE MATRIX SUBSTRATE AND METHOD FOR INSPECTING ELECTRO-OPTICAL DEVICE SUBSTRATE

(75) Inventor: Tokuro Ozawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/555,053

(22) PCT Filed: Oct. 15, 1999

(86) PCT No.: PCT/JP99/05723

§ 371 (c)(1),
(2), (4) Date: May 24, 2000

(87) PCT Pub. No.: WO00/23973

PCT Pub. Date: Apr. 27, 2000

(30) Foreign Application Priority Data

Oct. 16, 1998 (JP) .............................. 10-295656

(51) Int. Cl.⁷ .............................. G09G 3/36; G09G 5/00
(52) U.S. Cl. .......................... 345/211; 345/96; 345/97; 345/98; 345/99; 345/100
(58) Field of Search .............................. 345/87, 89, 90, 345/91, 92, 93, 94, 95, 96, 97, 98, 99, 100, 211; 349/54; 324/50, 770; 438/54

(56) References Cited

U.S. PATENT DOCUMENTS 5,175,504 A * 12/1992 Henley ........................ 324/501
5,764,209 A * 6/1998 Hawthorne et al. ............ 345/87
5,904,511 A * 5/1999 Misawa et al. .............. 438/154
6,049,321 A * 4/2000 Sasaki ........................ 345/99
6,052,104 A * 4/2000 Lee ............................. 345/92
6,111,620 A * 8/2000 Nishiki et al. ................ 349/54
6,281,700 B1 * 8/2001 Matsueda .................... 324/770
6,392,622 B1 * 5/2002 Ozawa ........................ 345/92
6,525,556 B2 * 2/2003 Matsueda .................... 324/770

FOREIGN PATENT DOCUMENTS

| JP | 1-127973 A | 5/1989 |
| JP | 2-135490 A | 5/1990 |
| JP | 03228294 | * 6/1993 |
| WO | WO00/23973 | 4/2000 |

* cited by examiner

Primary Examiner—Vijay Shankar
Assistant Examiner—Prabodh M. Dharia
(74) Attorney, Agent, or Firm—Oliff & Berridge, PLC (57) ABSTRACT

The invention provides a first gate-line breakage inspection process in which a signal for switching on each thin-film transistor is supplied to each gate of a first left-side transistor sequence, and a current value of a current flowing through two gate lines conducted by each thin-film transistor is measured. In a second gate-line breakage inspection process, a signal for switching on each thin-film transistor is supplied to each gate of a second left-side transistor sequence, and a current value of a current flowing through two gate lines conducted by each thin-film transistor is measured. Subsequently, it is determined whether any gate line is defective based on the inspection results of the first gate-line breakage inspection process and the second gate-line breakage inspection process.

17 Claims, 6 Drawing Sheets

ELECTRO-OPTICAL DEVICE SUBSTRATE, ACTIVE MATRIX SUBSTRATE AND METHOD FOR INSPECTING ELECTRO-OPTICAL DEVICE SUBSTRATE

BACKGROUND OF THE INVENTION

1. Field of the Invention

The present invention relates to electro-optical device substrates, active matrix substrates, and methods for inspecting the electro-optical device substrates.

2. Description of Related Art

Hitherto, liquid crystal display devices formed by a pair of substrates holding a liquid crystal therebetween have been known. Concerning these liquid crystal display devices, a display device in which an active matrix substrate is used as one of the pair of substrates has been put to practical use. Regarding the active matrix substrate, a plurality of data lines and a plurality of gate lines, the gate lines intersecting the data lines at right angles, are formed on a glass sheet or the like. A pixel electrode is formed in accordance with the intersection of each data line and each gate line. Each pixel electrode is connected via a thin-film transistor to each data line and each gate line.

The number of gate lines and data lines to be formed corresponds to the number of display pixels. For example, concerning a color liquid crystal display device, one type with 480 gate lines and 640×3 (corresponding to the RGB colors) data lines and another type with 1024 gate lines and 1280×3 data lines are known. Since it is necessary to form a large number of wires on the active matrix substrate, defective data lines and gate lines, such as broken or narrowed lines (portion where the wire is narrower than the other portions), are not permitted.

In reality, however, it is impossible to prevent wire defects from occurring at a certain rate in manufacturing processes of active matrix substrates due to various causes. Hence, there is a demand for positive detection of an active matrix substrate having a defective gate line or a defective data line and for accurate determination of the location of a breakage so as to prevent a defect, i.e., the breakage, which arises from the same cause, from recurring.

To this end, a breakage inspection method is disclosed in Japanese Unexamined Utility Model Publication No. 63-70596.

In this breakage inspection method, concerning a plurality of gate lines formed in a stripe arrangement on a substrate, adjacent gate lines (or data lines) are connected at ends thereof. Specifically, a first gate line and a second gate line are connected at left ends thereof, the second gate line and a third gate line are connected at right ends thereof, the third gate line and a fourth gate line are connected at left ends thereof, the fourth gate line and a fifth gate line are connected at right ends thereof, and so forth. With this arrangement, a single wire is formed by series connection of gate lines. By detecting whether a predetermined current flows through this wire, it is determined whether any defective gate line is present.

This breakage inspection method can inspect whether there is any defective gate line, but fails to inspect the specific location of a defective gate line. Therefore, with this inspection method, it fails to determine the location of a broken gate line and to pursue or infer by analogy a cause that has given rise to the defect. Hence, the inspection method has a drawback in that it is impossible to take effective steps to prevent breakages from recurring.

In the above breakage inspection method, the presence of a defect can be determined by allowing a predetermined current i to pass through the series connected wire and measuring a potential difference across both ends of the wire. Specifically, a voltage when no defect is present in any part of the wire is measured beforehand. This voltage is expressed by iNRL where RL represents a resistance value per line in the wire (such as the gate lines) and N represents the total number (such as the total number of the gate lines) of the wire.

Next, the potential difference across both ends of the wire to be inspected is measured. When a defect is present in any part of the wire, the measured voltage is expressed by i(RB+NRL) where RB represents a resistance value at the location of a defect, such as the narrowed portion or the like. Then, a difference between these voltages, that is, iNRL−i(RB+NRL), is obtained. When the resultant detected voltage is smaller than the predetermined value, it is determined that some portion of the wire is broken.

With this method, the voltage computed from the above equation is ≈0 when NRL>>RB. It is therefore impossible to perform defect detection. Specifically, the above method has a drawback in that, when the number of wires is great (that is, when the resistance NRL is great) or when the wire is narrowed but not completely broken (that is, when the resistance RB is relatively small under a condition where the wire is partially narrowed), it is difficult to perform defect detection.

In order to eliminate the above drawbacks, a method described hereinafter has been proposed to detect breakages or narrowed portions. This method is described with reference to FIG. 6. In an active matrix substrate S2 shown in FIG. 6, for example, a Y shift register 31, operating as a gate electrode drive circuit, and a buffer stage 33 are provided at left ends of gate lines (G1 to G6). A Y shift register 32 and a buffer stage 34 are provided at right ends.

Figure 6:
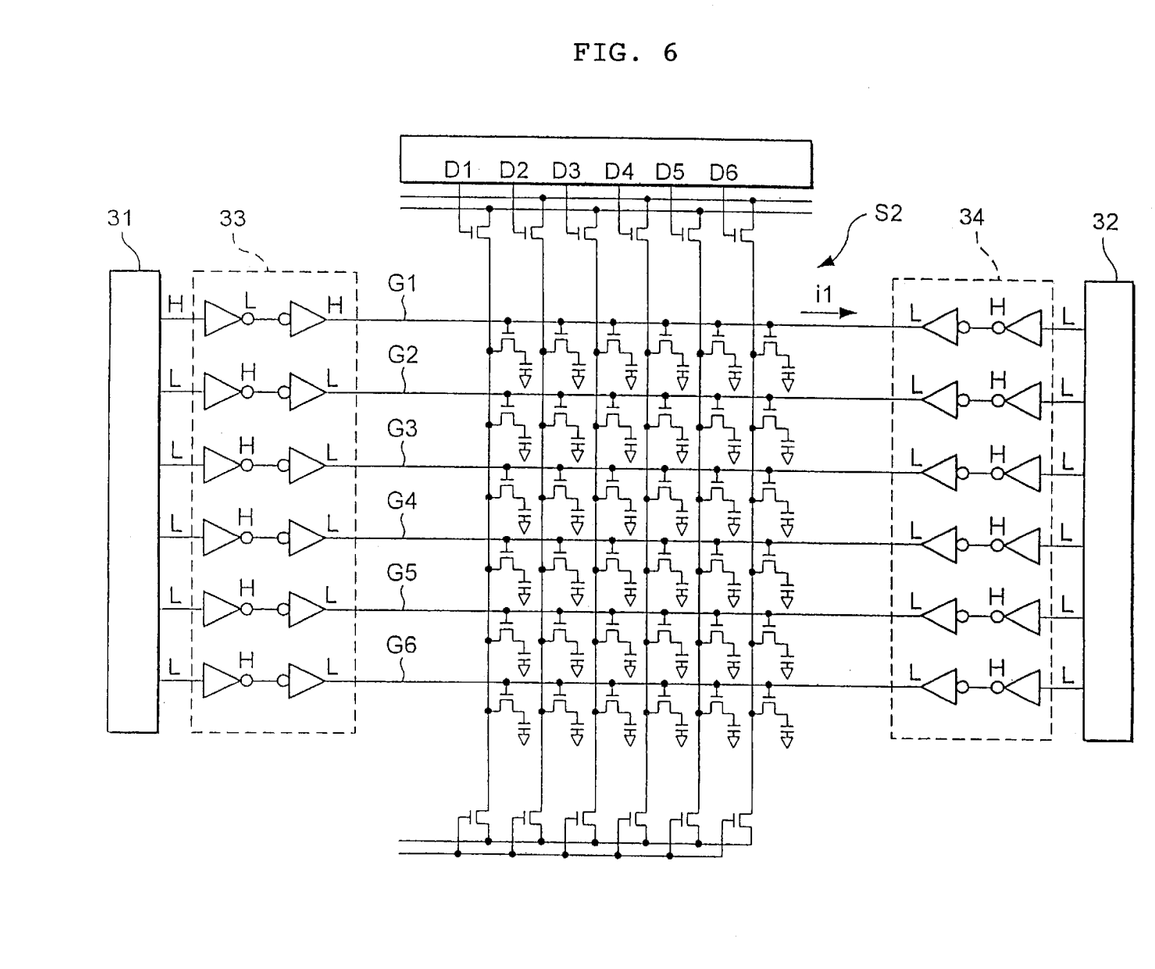
FIG. 6 is an illustration of an example of an electro-optical device substrate to which a conventional inspection method is applied.

In this inspection method, output levels of final stages of the buffer stage 34 on the side of the Y shift register 32 are set at a low level, and a selection pulse is input to the Y shift register 31. Specifically, output signals from final-stage inverters of the buffer stage 33 on the side of the Y shift register 31 are switched one after another from a low level to a high level. As a result, currents i1, i2, . . . i6 flow through the gate lines G1, G2, . . . G6 in order. By measuring each current value in the vicinity of the buffer stage 34, the method inspects the gate lines one by one for the presence of breakages.

If each of the current values of the currents i1, i2, . . . i6 is not smaller than a predetermined value, it is determined that no gate line is broken. In contrast, when the measured current value is not greater than the predetermined value, it is determined that the gate line is somehow defective.

When the Y shift registers 31 and 32 and the like are formed with polysilicon prepared by a low-temperature process having a maximum process temperature of about 400 to 600° C., it is known that there is a high risk that the Y shift registers 31 and 32 experience electro-static damage and malfunctioning is thereby caused. Furthermore, defective patterning may be caused due to an effect of particles and the like, thus causing malfunctioning in the Y shift registers 31 and 32.

Hence, when at least one of the Y shift registers 31 and 32 is defective and all of the buffer stages 33 and 34 are set at a high level, no current can pass through the gate lines (G1 to G6) by serially selecting the gate lines using the above breakage inspection method. Therefore, there is a fear of being unable to always perform breakage inspection in a stable manner using the above breakage inspection method.

In addition, in the above breakage inspection method, a large number of wires must be selected one after another for detecting the presence of breaks. Thus, the method has a drawback in that it requires a long period of time for inspection.

SUMMARY OF THE INVENTION

Accordingly, it is an object of the present invention to provide an electro-optical device substrate, an active matrix substrate, and a method for inspecting the electro-optical device substrate for quickly and accurately specifying the location of a defect and for always performing defect inspection in a stable manner.

To this end, according to one aspect of the present invention, there is provided an electro-optical device substrate including a plurality of wires, a plurality of switching devices, and a power-supply means. The switching devices are interposed between each of the adjacent wires. Each of the switching devices belongs to a first group or a second group. The adjacent switching devices belong to different groups. The switching devices belonging to the groups are switched on/off in units of each group. The power-supply means passes a current through pairs of wires connected in series via the switching devices or applies a voltage to the pairs of wires.

In another aspect of the present invention, there is provided a method for inspecting the above electro-optical device substrate. The method is for inspecting an electro-optical device substrate having a plurality of wires and a plurality of switching devices, interposed between each of the adjacent wires. The method divides the switching devices into a first group and a second group so that the adjacent devices belong to different groups. The method includes a first wire inspection step of switching on the switching devices belonging to the first group and allowing a current to pass through pairs of wires connected in series via the switching devices or applying a voltage to the pairs of wires, thus determining the presence of a defect in the pairs of wires; a second wire inspection step of switching on the switching devices belonging to the second group and allowing a current to pass through pairs of wires connected in series via the switching devices or applying a voltage to the pairs of wires, thus determining the presence of a defect in the pairs of wires; and a defect determining step of determining a defective wire based on the determination result of the first wire inspection step and the determination result of the second wire inspection step.

According to the method for inspecting the electro-optical device substrate, the presence of a defect in the pairs of adjacent wires can be determined. Hence, it is possible to quickly detect the presence of a defective wire. Also, since it is possible to determine the presence of a defect in the pairs of wires connected in series by the switching devices belonging to the first group and the presence of a defect in the pairs of wires connected in series by the switching devices belonging to the second group, a defective wire can be specified in a relatively detailed manner based on the determination results.

In another aspect of the present invention, there is provided an electro-optical device substrate including a plurality of wires, each wire including a first end and a second end; a plurality of first switching devices interposed near the first end between each of the adjacent wires, in which each of the first switching devices belongs to one of a first group and a second group, the adjacent switching devices belong to different groups, and the switching devices belonging to the groups are switched on/off in units of each group; a plurality of second switching devices interposed near the second end between each of the adjacent wires, in which each of the second switching devices belongs to one of a third group and a fourth group, the adjacent switching devices belong to a different group, and the switching devices belonging to the groups are switched on/off in units of each group; a first power-supply means for allowing a current to pass through a plurality of pairs of wires connected in series via the first switching devices or for applying a voltage to the pairs of wires; and a second power-supply means for allowing a current to pass through a plurality of pairs of wires connected in series via the second switching devices or for applying a voltage to the pairs of wires.

In another aspect of the present invention, there is provided a method for inspecting the electro-optical device substrate. The method divides the first switching devices into a first group and a second group so that the adjacent first switching devices belong to different groups. The method has an inspection step of performing one of a first step and a second step. The first step includes a first wire inspection step of switching on the switching devices belonging to the first group and allowing a current to pass through pairs of wires connected in series via the switching devices or applying a voltage to the pairs of wires using the second power-supply means, thus determining the presence of a defect in the pairs of wires; and a second wire inspection step of switching on the switching devices belonging to the second group and allowing a current to pass through pairs of wires connected in series via the switching devices or applying a voltage to the pairs of wires using the second power-supply means, thus determining the presence of a defect in the pairs of wires. The second step includes a first wire inspection step of switching on the switching devices belonging to the third group and allowing a current to pass through pairs of wires connected in series via the switching devices or applying a voltage to the pairs of wires using the first power-supply means, thus determining the presence of a defect in the pairs of wires; and a second wire inspection step of switching on the switching devices belonging to the fourth group and allowing a current to pass through pairs of wires connected in series via the switching devices or applying a voltage to the pairs of wires using the first power-supply means, thus determining the presence of a defect in the pairs of wires. This inspection method further includes a defect determining step of determining a defective wire based on the determination result of the first wire inspection step and the determination result of the second wire inspection step.

According to the method for inspecting the electro-optical device substrate, even when one of the first power-supply means and the second of the power-supply means functions incorrectly, the other power-supply means can be used to perform inspection. It is therefore possible to always perform inspection in a stable manner.

In the above electro-optical device substrate, each of the first power-supply means and the second power-supply means may be a circuit operable as a driving (or driving device) means for the wires. Specifically, each power-supply means may include a shift register for serially shirting data commanding each wire to be driven and 3-state buffers each corresponding to each stage of the shift register. An output terminal of each 3-state buffer may be connected to an end of each wire. With this arrangement, it is not necessary to provide an additional wire-inspection circuit, thus reducing the manufacturing cost.

In another aspect of the present invention, there is provided an electro-optical device substrate including a plurality of wires formed by alternately arranging individual first wires and individual second wires; a plurality of switching devices interposed between each of the first wires and each of the second wires which are adjacent to each of the first wires at one side; and a power-supply means for allowing a current to pass through pairs of wires connected in series via each of the switching devices or for applying a voltage to the pairs of wires.

In another aspect of the present invention, there is provided a method for inspecting the electro-optical device substrate. The method includes a wire inspection step of switching on the plurality of switching devices and allowing a current to pass through a plurality of pairs of wires connected in series via the switching devices or applying a voltage to the pairs of wires, thus determining the presence of a defect in the pairs of wires.

According to the method for inspecting the electro-optical device substrate, it is possible to determine the presence of a defect in the pairs of wires conducted in series. Thus, there is an advantage in that it is possible to promptly perform detailed wire inspection.

DESCRIPTION OF THE PREFERRED EMBODIMENTS

The present invention is described through embodiments with reference to the drawings.

Construction of an Electro-optical Device Substrate

Figure 1:
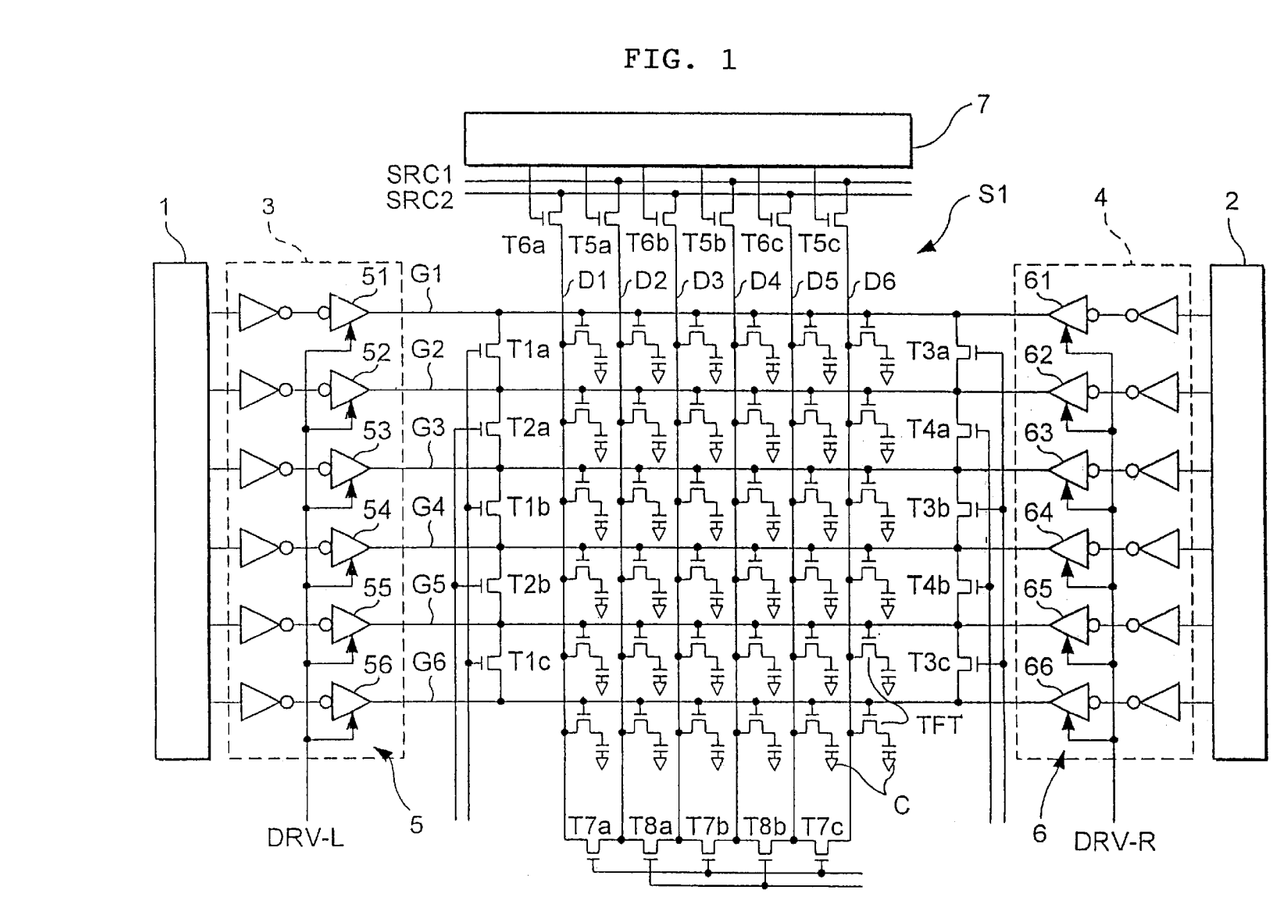
FIG. 1 is a block diagram of an electro-optical device substrate according to an embodiment of the present invention.

FIG. 1 is a block diagram of an electro-optical device substrate S1 according to the present invention. On the electro-optical device substrate S1, a plurality of gate lines are formed stretching in the horizontal direction, and a plurality of data lines are formed stretching in the vertical direction. In FIG. 1, the electro-optical device substrate S1 provided with six gate lines G1 to G6 and six data lines D1 to D6 is shown in order to simplify the description. In an actual electrooptical device, 480 gate lines and 640×3 (corresponding to the RGB colors) data lines or 1024 gate lines and 1280×3 data lines are formed.

A thin-film transistor (TFT) is formed at the intersection of each of the gate lines G1 to G6 and each of the data lines D1 to D6. A gate of each thin-film transistor is connected to the gate line, and a source of each thin-film transistor is connected to the data line. A drain of each thin-film transistor is connected to a pixel electrode. With this arrangement, each thin-film transistor is on-off controlled in accordance with a voltage applied to the gate line. When each thin-film transistor is in an on state, the voltage applied to the data line is supplied to each pixel electrode.

In this embodiment, the TFT is formed of a so-called polysilicon TFT having a polysilicon layer as a channel layer. The TFT is formed at the same time as transistors (switching devices) forming peripheral circuits by the same process.

The adjacent gate lines G1 to G6 are provided with a plurality of switching devices formed therebetween near both ends thereof Each of the switching devices switches between connection and disconnection of the adjacent gate lines. These switching devices are formed of, for example, the thin-film transistors (TFTs). The thin-film transistors are formed between the gate lines G1 and G2, between the gate lines G3 and G4, and between the gate lines G5 and G6. Among these, thin-film transistors T1a, T1b, and T1c formed near left ends of the respective gate lines are hereinafter generically referred to as a first left-side transistor sequence (T1a, T1b, and T1c), and thin-film transistors T3a, T3b, and T3c formed near right ends of the respective gate lines are generically referred to as a first right-side transistor sequence (T3a, T3b, and T3c). In contrast, the thin-film transistors are formed between the gate lines G2 and G3, and between the gate lines G4 and G5. Among these, thin-film transistors T2a and T2b formed near left ends of the respective gate lines are generically referred to as a second left-side transistor sequence (T2a and T2b), and thin-film transistors T4a and T4b formed near right ends of the respective gate lines are generically referred to as a second right-side transistor sequence (T4a and T4b).

The gates of the first left-side transistor sequence (T1a, T1b, and T1c) and the gates of the second left-side transistor sequence (T2a and T2b) are connected to a corresponding test terminal provided on the substrate. The thin-film transistors forming these transistor sequences are switched on/off in accordance with a signal input by the test terminal. Specifically, the thin-film transistors belonging to the transistor sequences are switched on/off in units of each transistor sequence.

Similarly, the gates of the first right-side transistor sequence (T3a, T3b, and T3c) and the gates of the second right-side transistor sequence (T4a and T4b) are connected to a corresponding test terminal provided on the substrate. The thin-film transistors forming these transistor sequences are switched on/off in accordance with the signal input by the test terminal. Specifically, the thin-film transistors belonging to the transistor sequences are switched on/off in units of each transistor sequence.

A Y shift register 1 is connected via a buffer stage 3 to left ends of the gate lines G1 to G6. In contrast, a Y shift register 2 is connected via a buffer stage 4 to right ends of the gate lines G1 to G6.

A 3-state buffer group 5 is formed in a final stage of the buffer stage 3. A signal DRV-L is supplied from a host system (not shown) to each of 3-state buffers 51 to 56 forming the 3-state buffer group 5. A 3-state buffer group 6 is formed in a final stage of the buffer stage 4. A signal DRV-R is supplied from the host system (not shown) to each of 3-state buffers 61 to 66 forming the 3-state buffer group 6. When the signal DRV-L or DRV-R supplied from the host system is at a high level, each of the 3-state buffers forming the 3-state buffer group 5 and the 3-state buffer group 6 inverts the level of output signals from the previous-stage inverters and outputs the inverted signals to the gate lines. When the signal DRV-L or the DRV-R supplied from the host system is at a low level, an output section of each of the 3-state buffers is in a high-impedance state. The above host system includes, for example, a test system capable of supplying the signal DRV-L or DRV-R to each of the 3-state buffers through the test terminal provided on the substrate.

Ends (upper ends in FIG. 1) of the data lines D1, D3, and D5 are connected to a data input line SRC2 via thin-film transistors T6a, T6b, and T6c. Ends (upper ends in FIG. 1) of the data lines D2, D4, and D6 are connected to a data input line SRC1 via thin-film transistors T5a, T5b, and T5c. Gates of these thin-film transistors are connected to an X shift register 7. Each of the thin-film transistors is on-off controlled in accordance with a signal supplied from the X shift register 7. This allows for switching between connection and disconnection of the data lines D1, D3, and D5 and the data input line SRC2, and switching between connection and disconnection of the data lines D2, D4, and D6 and the data input line SRC1. Specifically, a voltage supplied from the host system (not shown) to the data input lines SRC1 and SRC2 is applied to the data lines D1 to D6.

Thin-film transistors for switching between connection/disconnection of the adjacent data lines are formed at other ends (lower ends in FIG. 1) of the data lines D1 to D6. Hereinafter, a thin-film transistor T7a formed between the data lines D1 and D2, a thin-film transistor T7b formed between the data lines D3 and D4, and a thin-film transistor T7c formed between the data lines D5 and D6 are generically referred to as a first transistor sequence (T7a, T7b, and T7c). In contrast, a thin-film transistor T8a formed between the data lines D2 and D3 and a thin-film transistor T8b formed between the data lines D4 and D5 are generically referred to as a second transistor sequence (T8a and T8b).

The gates of the first transistor sequence (T7a, T7b, and T7c) and the gates of the second transistor sequence (T8a and T8b) are connected to corresponding test terminals provided on the substrate. The thin-film transistors forming the transistor sequences are switched on/off in accordance with the signal input from the test terminals. Specifically, the thin-film transistors belonging to the transistor sequences are switched on/off in units of each transistor sequence.

The construction of the electro-optical device substrate according to the present invention has been described.

Inspection Process for the Electro-optical Device Substrate

Next, a process of determining the presence of a defect and the location of a breakage in the gate lines G1 to G6 is described with reference to a flowchart shown in FIG. 2, and to FIG. 3(a) and FIG. 3(b).

First, the process inspects the function of the Y shift register 1 or 2 (step ST1) and determines whether each Y shift register functions correctly (step ST2). The inspection of the Y shift registers is performed by the process described below. Specifically, some data is input from a test terminal provided on the substrate to a data input terminal of the Y shift register 1, and the data is shifted by the Y shift register 1. The process determines whether the Y shift register 1 functions correctly by detecting and investigating data output from a final stage of the Y shift register 1 through another test terminal. The process performs a similar inspection process for the Y shift register 2, and determines whether each of the Y shift registers functions correctly.

If a determination result is that both the Y shift registers 1 and 2 are defective, it is determined that the electro-optical device substrate S1 is defective. The inspection process is immediately terminated (steps ST3 and ST4) since it is unnecessary to inspect the gate lines G1 to G6 and the like for the presence of a defect.

If it is determined in step ST2 that one or both of the Y shift registers are good, the process proceeds to inspect the gate lines G1 to G6 for the presence of breakages. Even if one of the Y shift registers is determined to be defective, the other Y shift register can be employed to display an image. At this point, the electro-optical device substrate itself is regarded as good, and the subsequent inspection process is performed.

The inspection of the gate lines G1 to G6 for the presence of a defect is divided into a first data-line breakage inspection process and a second data-line breakage inspection process. The contents of the inspection are described below for each of the inspection processes. It is assumed that the Y shift register 1 is determined as being defective in step ST2 (step ST9).

(1) First Data-line Breakage Inspection Process

First, a signal for switching on each thin-film transistor is input from the test terminal on the substrate to each gate of the first left-side transistor sequence (T1a, T1b, and T1c). In contrast, the second left-side transistor sequence (T2a and T2b), the first right-side transistor sequence (T3a, T3b, and T3c), and the second right-side transistor sequence (T4a and T4b) are maintained in the off state. A low-level DRV-L is supplied to each of the 3-state buffers 51 to 56 in the buffer stage 3 connected to the Y shift register 1, and an output section of each of the 3-state buffers 51 to 56 is maintained in a high-impedance state.

Figure 3:
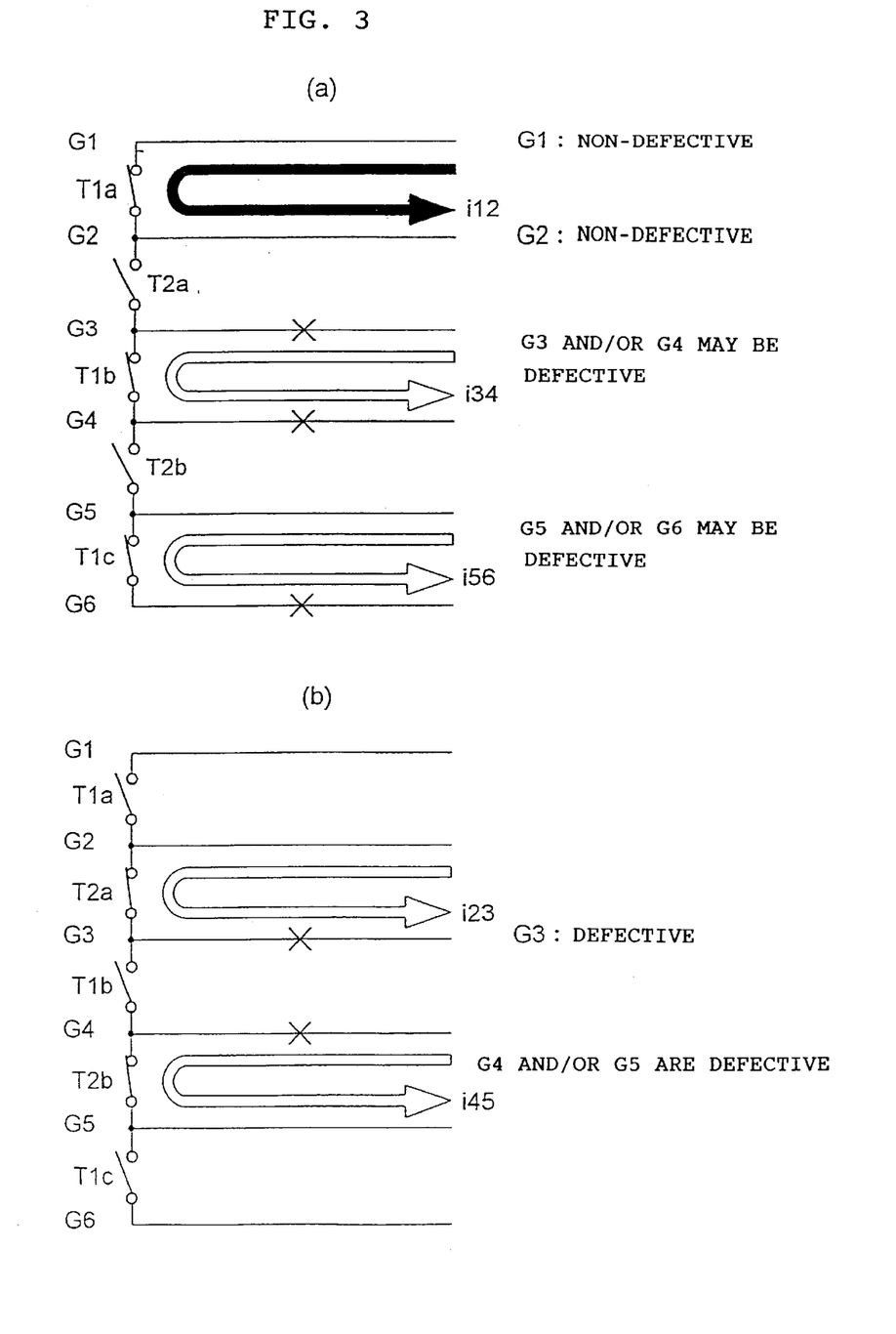
FIGS. 3(a) and 3(b) include illustrations of the inspection process for the electro-optical device substrate of the embodiment.

As a result, as shown in FIG. 3(a), the gate lines G1 and G2, the gate lines G3 and G4, and the gate lines G5 and G6 are conducted, respectively, at left ends thereof.

Next, the Y shift register 2 serially shifts a 1-bit datum "1", and currents flow through the connected gate lines one after another. Specifically, when an output state of six stages of the Y shift register 2 is "100000", a high-level signal is output from the 3-state buffer 61, and low-level signals are output from the other 3-state buffers. As a result, when neither the gate line G1 nor G2 is broken, a current i12 flows through a path from the gate line G1→ the thin-film transistor T1a→ the gate line G2. Next, when the Y shift register 2 is operated, and the output state of the six stages of the Y shift register 2 becomes "001000", a high-level signal is output from the 3-state buffer 63, and low-level signals are output from the other 3-state buffers. As a result, when neither the gate G3 nor G4 is broken, a current i34 flows through a path from the gate line G3→ the thin-film transistor T1b→ the gate line G4. Furthermore, when the Y shift register 2 is operated, and the output state of the six stages of the Y shift register 2 becomes "000010", a high-level signal is output from the 3-state buffer 65 and low-level signals are output from the other 3-state buffers. As a result, when neither the gate line G5 nor G6 is broken, a current i56 passes through a path from the gate line G5→ the thin-film transistor T1c→ the gate line G6. Accordingly, the currents flow through the pairs of connected gate lines one after another.

In parallel with this process, current values of the currents i12, i34, and i56 are measured in order. Measurement of each current value is performed by measuring, by an ammeter, a power-supply current of the overall electro-optical device substrate, including a power-supply current of each of the 3-state buffers and obtaining a difference between the overall power-supply current and a power-supply current when the output state of the six stages of the Y shift register 2 is "000000".

Alternatively, current-measurement pads may be formed at output terminals of the 3-state buffers 61 to 66, and a probe may be pressed against the pads to obtain a voltage across two pads, i.e., a voltage drop across two gate lines. A specific process is as follows. When there is no breakage or narrowed portion in a pair of continuous gate lines, a detected voltage is 2iRL where i represents a current value of a current flowing through the pair of gate lines and RL represents a resistance value per gate line. In contrast, when a narrow portion is present in either of the gate lines, a measured voltage is expressed by i(RB+2RL) where RB represents a resistance value at the location of a defect, such as the narrow portion of the line. Then, a difference in these voltages, i.e., 2iRL−i(RB+2RL), is obtained. By comparing the obtained value with a predetermined value, it is determined whether there is any breakage or narrowed portion in the gate lines. The conventional wire inspection method described in the background art, in which all gate lines are connected to form a single wire and a potential difference is obtained across both ends of the wire, has a drawback in that it is difficult to detect a defect when there are a large number of wires. In contrast, according to this embodiment, since a voltage drop across two conducted gate lines is obtained, there is an advantage in that it is possible to positively detect a defect in each wire even when there are a large number of wires.

Hereinafter it is assumed that the process obtains a current value of a current flowing through each of the gate lines, and, based on the current value, determines the presence of a defect.

By comparing each of the obtained current values and a predetermined value obtained in advance, the process determines the presence of breaks in each of the gate lines (step ST10). Specifically, for example, when the measured current value exceeds the predetermined value, it is determined that the gate lines are not broken. If the measured current value is below the predetermined value, it is determined that either of the gate lines is broken. The predetermined value is a value obtained in advance based on experimental results and the like.

In an example shown in FIG. 3(a), a solid arrow indicates the flow of current exceeding the predetermined value. In contrast, an empty arrow indicates the flow of current below the predetermined value or no current flow at all. In the example shown in FIG. 3(a), only the current i12 exceeds the predetermined value. Thus, it is determined that the gate lines G1 and G2 are not broken. In contrast, the current i34 is below the predetermined value. Thus, it is determined, at this stage, that either or both the gate lines G3 and G4 are broken or have defects such as narrow portions. Similarly, since the current i56 is below the predetermined value, it is determined that either or both the gate lines G5 and G6 are broken.

At this point, the process fails to specify which of the pairs of gate lines (the gate lines G3 and G4, and the gate lines G5 and G6), determined to be broken, is broken. In order to clarify this, the second data-line breakage inspection process described below is performed after the above process. Therefore, when the current values of the currents flowing through all gate lines exceed the predetermined value in the first data-line breakage inspection process, the second data-line breakage inspection process described below can be omitted. In this case, the labor involved in measuring current values is about half of the conventional wire inspection method shown in FIG. 6.

(2) Second Data-line Breakage Inspection Process

Subsequently, the signal for switching on each thin-film transistor is input from the test terminal to each gate of the second left-side transistor sequence (T2a and T2b). In contrast, the first left-side transistor sequence (T1a, T1b, and T1c), the first right-side transistor sequence (T3a, T3b, and T3c), and the second right-side transistor sequence (T4a and T4b) are maintained in the off state. The output section of each of the 3-state buffers 51 to 56 in the buffer stage 3 is caused to be in a high-impedance state.

Accordingly, as shown in FIG. 3(b), the gate lines G2 and G3, and the gate lines G4 and G5 are conducted, respectively, at left ends thereof. Subsequently, the Y shift register 2 serially shifts a 1-bit datum "1", and currents flow through pairs of connected gate lines one after another as the described above first gate line breakage inspection process. Specifically, when the output state of the six stages of the Y shift register 2 becomes "010000", and when neither the gate line G2 nor G3 is broken, a current i23 flows through a path from the gate line G2→ the thin-film transistor T2a→ the gate line. Next, when the Y shift register 2 is operated, and the output state of the six stages of the Y shift register 2 becomes "000100", a current i56 flows through a path from the gate line G4→ the thin-film transistor T1b→ the gate line G5.

Current values of the currents i23 and i45 are measured by a process similar to that described in the first data-line breakage inspection process. Next, the measurement result is compared with the above predetermined value. If the measured current value exceeds the predetermined value, it is determined that the gate lines are not broken. In contrast, when the measured current value is below the predetermined value, it is determined that either or both of the pair of gate lines are broken. Specifically, since both the currents i23 and i45 are below the predetermined value in the example shown in FIG. 3(b), it is determined that there is a possibility that either or both the gate lines G2 and G3, and either or both the gate lines G4 and G5 are broken.

By taking into account this determination result and the determination result obtained in the first data-line breakage inspection process, it is possible to specify the defective gate line. Specifically, it is determined in the second data-line breakage inspection process that either or both the gate lines G2 and G3 are defective; in the first data-line breakage inspection process, it is determined that the gate line G2 is not defective. By taking these determination results into consideration, it is eventually specified that the gate line G3 is defective.

Concerning the gate lines G4, G5, and G6, all of the currents i34, i45, and i56 are below the predetermined value. Hence, it is impossible to specify the defective gate lines. However, it is determined that there are continuous or discontinuous defects along the gate lines G4 and G5.

If it is determined by the above inspection that any of the gate lines is defective, the electro-optical device substrate is determined to be defective, and the inspection process is terminated (steps ST10, ST3, and ST4). In contrast, if it is determined that none of the gate lines is defective, the electro-optical device substrate is determined to be good (steps ST11 and ST17). Here, it is determined in step ST1 that the Y shift register 1 does not function correctly. Therefore, when the electro-optical device substrate S1 is employed for an actual electrooptical device, the Y shift register 2 drives each gate line (step ST12). In this case, each of the 3-state buffers 51 to 56 forming the 3-state buffer group 5 on the side of the malfunctioning Y shift register 1 are maintained in a high-impedance state.

By checking a wire formation process or the like near the gate lines G3 to G6 based on the result of the inspection (step ST9) described above, it is possible to track or estimate factors causing breakages. It is therefore possible to take steps for preventing gate-line breakages and the like from recurring. Since the presence of breaks in the gate lines can be detected in a short period of time, it is possible to positively prevent a defective or broken electro-optical device substrate from being supplied to an electrooptical device assembly line.

Figure 2:
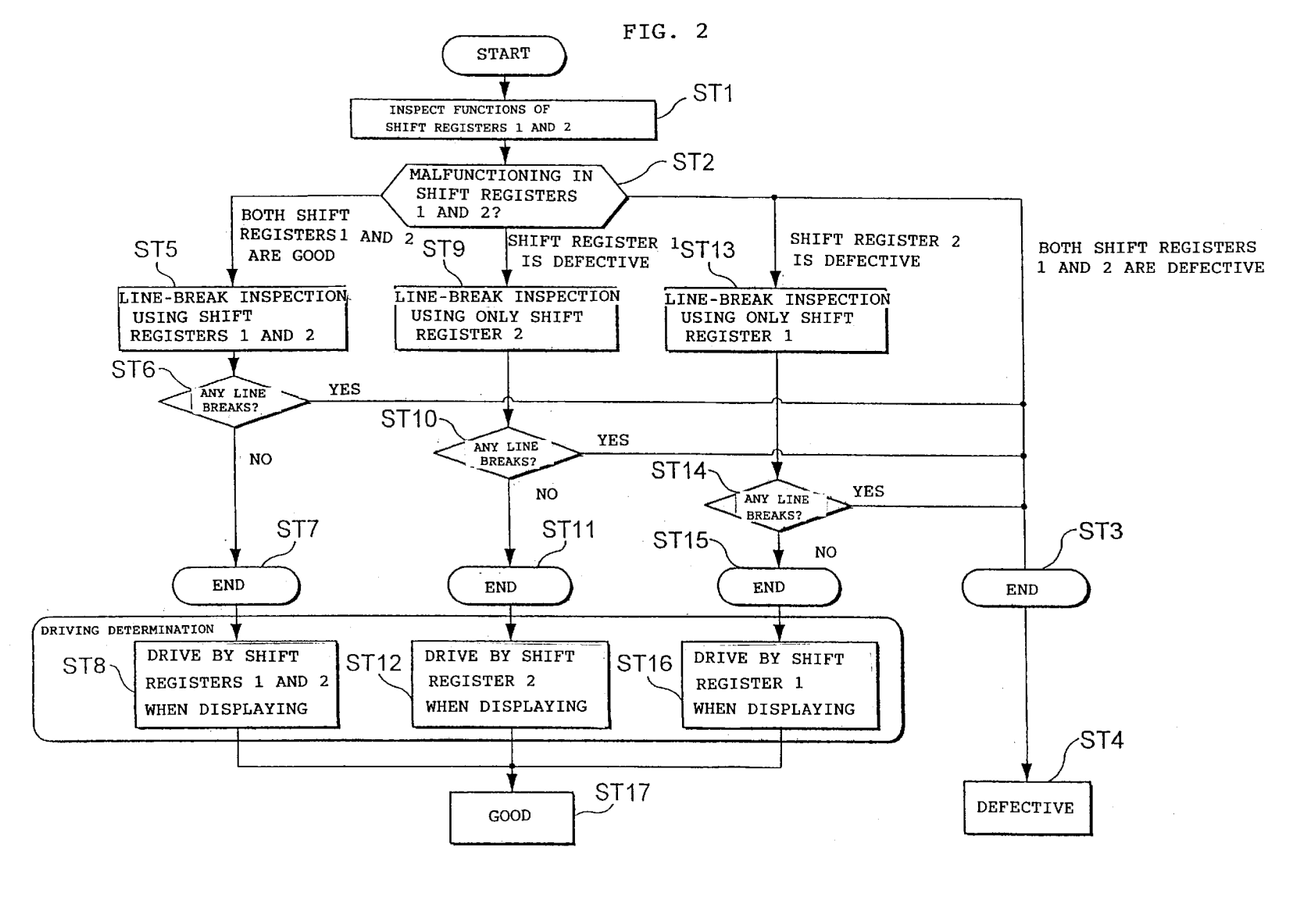
FIG. 2 is a flowchart describing an inspection process for the electro-optical device substrate of the embodiment.

If it is determined in step ST2 in FIG. 2 that there is some malfunctioning in the Y shift register 2, a series of inspection processes in step ST9 is performed by the Y shift register 1 (step ST13). Specifically, a low-level DRV-R signal is supplied to each of the 3-state buffers 61 to 66 in the buffer stage 4, and an output section of each of the 3-state buffers 61 to 66 is caused to be in a high-impedance state. In the first data-line breakage inspection process, the signal for switching on each thin-film transistor is input from the test terminal to each gate of the first right-side transistor sequence (T3a, T3b, and T3c). In contrast, the first left-side transistor sequence (T1a, T1b, and T1c), the second left-side transistor sequence (T2a and T2b), and the second right-side transistor sequence (T4a and T4b) are maintained in the off state. As a result, the gate lines G1 and G2, the gate lines G3 and G4, and the gate lines G5 and G6 are conducted, respectively, at right ends thereof.

The Y shift register 1 is operated under this condition, and a current passes through each pair of connected gate lines. The current value of the current is measured. By comparing the measured current value with the predetermined value, the presence of a breakage in each gate line is determined.

In the second data-line breakage inspection process, the signal for switching on each thin-film transistor is input from the test terminal to each gate of the second right-side transistor sequence (T4a and T4b). In contrast, the first left-side transistor sequence (T1a, T1b, and T1c), the second left-side transistor sequence (T2a and T2b), and the first right-side transistor sequence (T3a, T3b, and T3c) are maintained in the off state. As a result, the gate lines G2 and G3, and the gate lines G4 and G5 are conducted, respectively, at right ends thereof. The Y shift register 1 is operated under this condition, and a current passes through each pair of connected gate lines. By comparing the current value of this current with the predetermined value, the presence of a breakage in each gate line is determined (step ST14).

Here, it is assumed that the Y shift register 2 is determined as being defective in step ST2. If it is determined by the above inspection that none of the wires is defective, the gate lines on the electro-optical device substrate are driven by the Y shift register 1 (step ST16).

If it is determined in step ST2 in FIG. 2 that both the Y shift registers 1 and 2 are good, a process similar to the series of inspection processes in step ST9 is performed by either or both the Y shift registers 1 and 2 (step ST5). If it is determined by the inspection process that none of the wires is defective, the gate lines on the electro-optical device substrate are driven by either or both the Y shift registers 1 and 2 (step ST8).

As described above, according to the electro-optical device substrate S1 of the present invention, even when one of the right and left Y shift registers or buffer stages experiences electro-static damage or does not function correctly due to defective patterning, breakage inspection can be performed as long as one of the shift registers or the buffer stages is in a normal operating state. Also, each of the 3-state buffers in the buffer stages can be independently maintained in a high-impedance state. Even if one of the shift registers does not function correctly, the 3-state buffer group on the side of the malfunctioning shift register can be maintained in a high-impedance state, and it is possible to perform driving as in the past. The rate of good electrooptical devices is thereby increased.

Next, a defect inspection process for inspecting the data lines D1 to D6 is described.

The inspection of the data lines D1 to D6 is performed by a process which is basically similar to the process for inspecting the gate lines. Concerning the breakage inspection of the data lines D1 to D6, description hereinafter is divided into a first data-line breakage inspection process and a second data-line breakage inspection process.

(1) First Data-line Breakage Inspection Process

First, a signal for switching on each thin-film transistor is supplied from the test terminal to each gate of the first transistor sequence (T7a, T7b, and T7c). In contrast, the second transistor sequence (T8a, T8b, and T8c) is maintained in the off state. As a result, the data lines D1 and D2, the data lines D3 and D4, and the data lines D5 and D6 are conducted, respectively, at ends thereof. An H-level voltage is applied to the data signal line SRC2, and an L-level voltage is applied to the data signal line SRC1. Next, the X shift register 7 serially shifts 2-bit data "11", and a current flows through each of the connected gate lines. Specifically, when an output state of six stages of the X shift register 7 becomes "110000", the data line D1 and the data signal line SRC2 are conducted, and the data line D2 and the data signal line SRC1 are conducted. As a result, when neither the data line D1 nor D2 is broken, a current i12 flows through a path from the data line D1→ the thin-film transistor T7a→ the gate line D2. Subsequently, the X shift register 7 is operated, and the output state of the six stages of the X shift register 7 becomes "001100". This conducts the data line D3 to the data signal line SRC2, and the data line D4 to the data signal line SRC1. As a result, when neither the data line D3 nor D4 is broken, a current i34 flows through a path from the data line D3→ the thin-film transistor T7b→ the data line D4. Similarly, the output state of the six stages of the X shift register 7 becomes "000011", and a current i56 flows through the data lines D5 and D6. Accordingly, the current serially flows through each pair of data lines connected by the first transistor sequence (T7a, T7b, and T7c). In parallel with the above process, current values of the currents i12, i34, and i56 are measured. By comparing the measured current values with a predetermined value, the presence of breakages in each pair of connected data lines is determined.

(2) Second Data-Line Breakage Inspection Process

Next, the signal for switching on each thin-film transistor is input from the test terminal to each gate of the second transistor sequence (T8a and T8b). In contrast, the first transistor sequence (T7a, T7b, and T7c) is maintained in the off state. As a result, the data lines D2 and D3, and the data lines D4 and D5 are conducted, respectively, at lower ends thereof. Subsequently, the X shift register 7 is used to switch on the thin-film transistor T5a connected to the data line D2 and the thin-film transistor T5b connected to the data line D3. As a result, a current i23 flows through the data lines D2 and D3. By following the above steps, a current i45 flows through the data lines D4 and D5. Current values of the currents i23 and i45 are measured. By comparing the measured current values with the predetermined value, the presence of breaks in each pair of connected data lines is determined.

By taking into consideration the results of the first data-line breakage inspection process and the second data-line breakage inspection process, it is possible to determine the defective data line. Of course, if it is understood in the first data-line breakage inspection process that none of the data lines is broken or narrowed, it is not necessary to perform the second data-line breakage inspection process.

Concerning the final determination which takes into consideration the determinations of the first data-line breakage inspection process and the second data-line inspection process and the determination result of the two inspection processes, the final determination can be automatically obtained by a microcomputer or the like.

The results of the breakage inspection may be stored in a memory, such as a hard disk. Alternatively, a hardcopy of the results may be made. Accordingly, the breakage results can be put to practical use as data for research on causes of the breakages and the like.

In this embodiment, the example is described in which six gate lines and six data lines are provided in order to simplify the description. In an actual electrooptical device, one type with 480 gate lines and 640×3 (corresponding to the RGB colors) data lines and another type with 1024 gate lines and 1280×3 data lines are known. Even in the electrooptical devices as described above, the breakage inspection of each gate line and each data line can be performed by the above process.

Overall Construction of an Electrooptical Device

Figure 4:
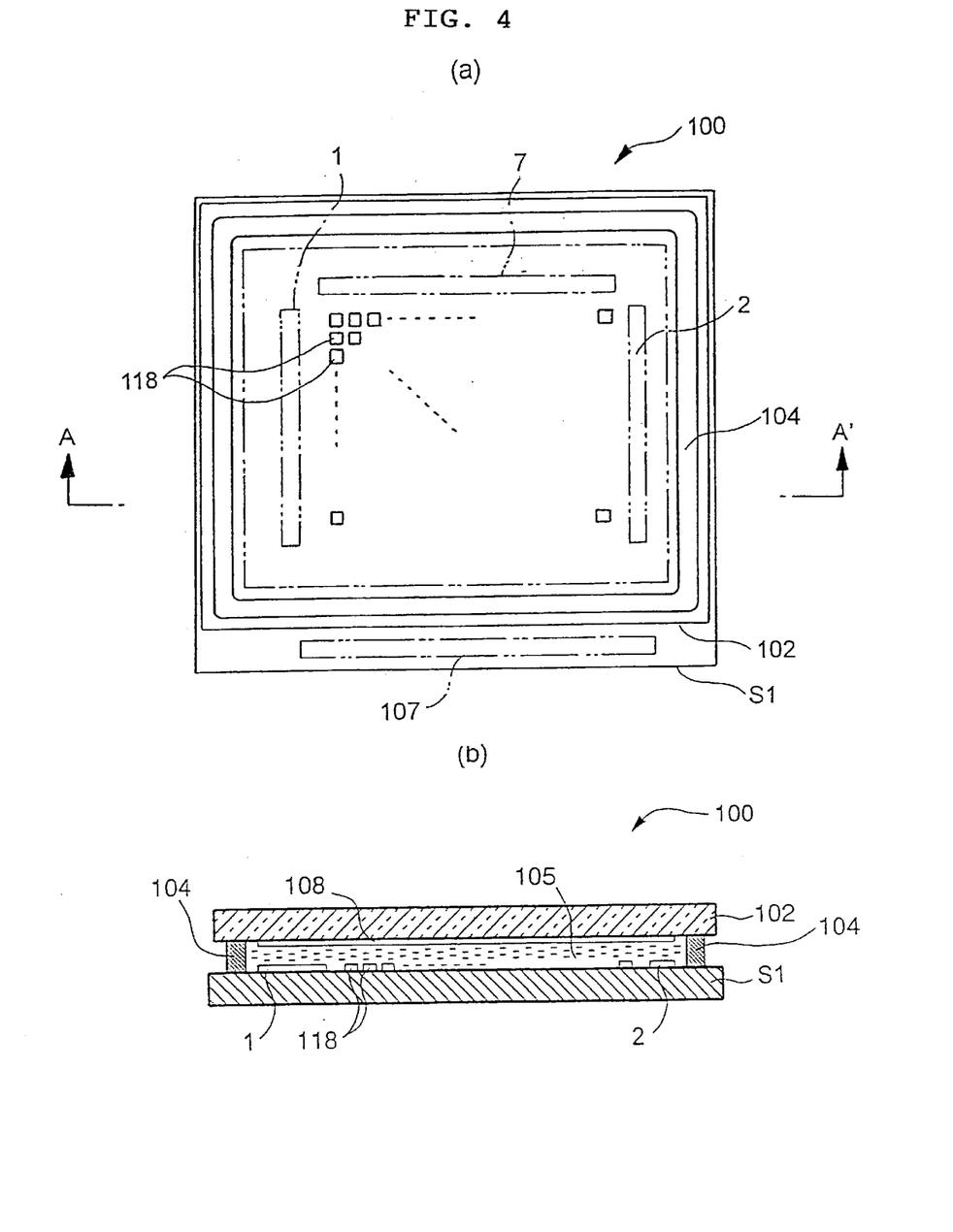
FIG. 4(a) is a plan view of an electrooptical device using the electro-optical device substrate of the embodiment.
FIG. 4(b) is a sectional view taken along the line A–A' of FIG. 4(a).

Referring now to FIG. 4, a construction of an electrooptical device using the above electro-optical device substrate is described. FIG. 4(a) is a plan view of the construction of the electrooptical device. FIG. 4(b) is a sectional view taken along the line A–A' of FIG. 4(a).

As shown in these drawings, concerning an electrooptical device 100, the electro-optical device substrate S1 according to the above embodiment and an opposing substrate 102 are bonded together by a sealing material 104 with a separation. A counter electrode 108 or the like is formed on a surface of the opposing substrate 102, which opposes the electro-optical device substrate S1. A liquid crystal 105 as an electrooptical material is held between the two substrates. In fact, the sealing material 104 has a notch. After sealing in the liquid crystal 105 through the notch, the notch is sealed by sealant. However, the notch and the sealant are not shown in FIGS. 4(a) and 4(b). As described above, the thin-film transistors (not shown in FIGS. 4(a) and 4(b)) are provided in accordance with the intersections of the gate lines and the data lines. Pixel electrodes 118 are connected to drains of the thin-film transistors. The pixel electrodes 118 are disposed in a matrix arrangement corresponding to the intersection of each gate line and each data line, as shown in FIG. 4(a). In a region 107 in FIG. 4(a), connecting terminals are formed. An end of each of the connecting terminals is connected to the above Y shift registers 1 and 2, the X shift register 7, and the like. In contrast, the end of each of the connecting terminals is connected to an output terminal of an external device. Accordingly, a signal and a power supply from the external device are supplied to each part of the electrooptical device 100.

Modified Example

Figure 5:
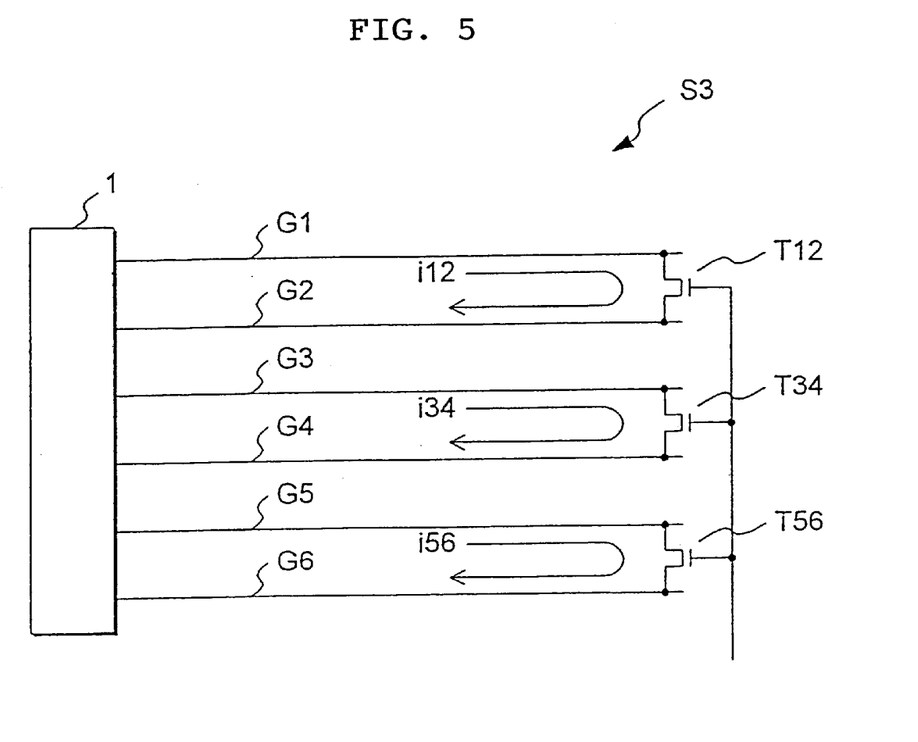
FIG. 5 is an illustration of a construction of an electro-optical device substrate according to a modified example of the present invention.

The electro-optical device substrate S1 according to the above embodiment is constructed such that ends of the gate lines are connected to the Y shift registers 1 and 2, and the thin-film transistors are formed between all the adjacent gate lines. However, the construction of the present invention is not limited to that embodiment. With reference to FIG. 5, an electro-optical device substrate S3 and an inspection method therefor according to a modified example of the present invention are described below.

As shown in the drawing, the electro-optical device substrate 3 includes a plurality of gate lines G1 to G6 and a Y shift register 1. In FIG. 5, only six gate lines are shown for convenience. It is needless to say that a greater number of gate lines are provided in an actual electrooptical device. In FIG. 5, only the gate lines G1 to 66 and the Y shift register 1 are shown. In practice, as in the above embodiment, a plurality of data lines and an X shift register are provided.

As shown in FIG. 5, ends of gate lines are connected to the Y shift register 1. Other ends of the gate lines G1 to G6, which are opposite to the ends connected to the Y shift register 1, are connected to a plurality of switching devices. Each switching device may be, for example, a thin-film transistor, for switching between connection and disconnection of two connected gate lines. Specifically, a thin-film transistor T12 is provided between the gate lines G1 and G2; a thin-film transistor T34 is provided between the gate lines G3 and G4; and a thin-film transistor T45 is provided between the gate lines G4 and G5. As shown in FIG. 5, the thin-film transistors are provided between the odd-numbered gate lines G1, G3, and G5 and the even-numbered gate lines G2, G4, and G6 from the top, respectively, which are adjacent to the odd-numbered gate line at one side (lower side in FIG. 5). A gate of each of the thin-film transistors T12, T34, and T56 is connected to a respective test terminal provided on the substrate. A signal supplied from the test terminal causes the thin-film transistors T12, T34, and T56 to be switched on/off In the electro-optical device substrate S3 as described above, a gate-line breakage inspection process is performed as below.

First, a predetermined voltage is applied to the gates of the thin-film transistors T12, T34, and T56 and turns on the thin-film transistors. As a result, the gate lines G1 and G2, the gate lines G3 and G4, and the gate lines G5 and G6 are conducted, respectively, near right ends thereof. Next, the Y shift register 1 serially shifts a 1-bit datum "1", and currents flow through the connected gate lines one after another. Specifically, an output state of six stages of the Y shift register 1 is set to "100000". As a result, when neither the gate line G1 nor G2 is broken, a current i12 flows through a path from the gate line G1→ the thin-film transistor T12→ the gate line G2. Next, the Y shift register 1 is operated, and the output state of the six stages of the Y shift register 1 becomes "001000". Hence, a current i34 flows through the gate lines G3 and G4. Subsequently, a similar operation is performed and a current i56 flows through the gate lines G5 and G6.

In parallel with the above process, current values of the currents i12, i34, and i56 are measured successively. By comparing the measured values with a predetermined value obtained in advance, the presence of breaks in each gate line is determined.

According to the modified example, the process fails to specify the single defective gate line, as in the above embodiment. However, the process can determine whether either of a pair of gate lines is defective. In addition, the process does not need to perform a process corresponding to the second gate-line breakage inspection process (i.e., an inspection process by switching from gate lines to be connected to other gate lines) in the above embodiment. Therefore, the process has an advantage in that it can perform inspection in a shorter period of time compared with the above embodiment.

What is claimed is:

1. An electro-optical device substrate, comprising:

a plurality of wires;

a plurality of switching devices interposed between each parallel pair of the wires, wherein the each pair of the wires comprise adjacent two wires, and each of the switching devices belongs to one of a first group and a second group, and one of the adjacent switching devices interposed between a first wire and adjacent one wire and another one of the adjacent switching devices interposed between the first wire and adjacent another wire belongs to different groups, and the switching devices belonging to the groups are switched on/off in units of each group; and a shift register that serially shifts data supplied to the each pair of the wires, the electro-optical device substrate allowing a current to pass through the each pair of the wires connected in series via the switching devices switched on or applying a voltage to the first wire of the each pair of the wires, and allowing a current to pass through the each pair of the wires connected in series via the switching devices switched on or applying a voltage to the first wire of the each pair of the wires based on the data which is shifted for serially by the shift register one after another.

2. An electro-optical device substrate, comprising:

a plurality of wires, each wire including a first end and a second end;

a plurality of first switching devices interposed near the first end between each of the adjacent parallel wires, each of the first switching devices belonging to one of a first group and a second group, the adjacent switching devices belonging to different groups, and the switching devices belonging to the groups being switched on/off in units of each group;

a plurality of second switching devices interposed near the second end between each of the adjacent wires, each of the switching devices belonging to one of a third group and a fourth group, the adjacent switching devices belonging to different groups, and the switching devices belonging to the groups being switched on/off in units of each group;

a first power-supply that allows a current to pass through pairs of wires connected in series via the first switching devices or that applies a voltage to the pairs of wires; and a second power-supply that allows a current to pass through pairs of wires connected in series via the second switching devices or that applies a voltage to the pairs of wires.

3. The electro-optical device substrate as set forth in claim 2, each of the first power-supply and the second power-supply being a circuit operable as a driving device for the a plurality of wires.

4. The electro-optical device substrate as set forth in claim 3, each of the first power-supply and the second power-supply comprising a shift register for serially shifting data commanding each wire to be driven, and 3-state buffers each corresponding to each stage of the shift register, an output terminal of each 3-state buffer being connected to the end of each wire.

5. An active matrix substrate, comprising:

a plurality of selection lines;

a plurality of signal lines;

a switching device connected to each of the selection lines and the signal lines;

a pixel electrode connected to each switching device;

a shift register that serially shifts signal setting on/off of data supply to the plurality of signal lines;

a plurality of switching devices interposed between each pair of the signal lines, wherein the each pair of the signal lines comprise adjacent two signal lines, and each of the switching devices belongs to one of a first group and a second group, and one of the adjacent switching devices interposed between a first signal line and adjacent one signal line and another one of the adjacent switching devices interposed between the first signal line and adjacent another signal line belongs to different groups, and the switching devices belonging to the groups are switched on/off in units of each group, and the plurality of switching devices interposed between one pair of the signal lines including a signal line in which the shift register supply the data to the signal line being switched on, and the plurality of switching devices interposed between another pair of the signal lines including the signal line being switched off; and a signal line driving circuit operable for driving each signal line, the signal line driving circuit allowing a current to pass through the each pair of the signal lines connected in series via the switching devices switched on or applying a voltage to the each pair of the signal lines, and allowing a current to pass through the each pair of the signal lines connected in series via the switching devices switched on or applying a voltage to the each pair of the signal lines based on the signal which is shifted serially by the shift register one after another.

6. An active matrix substrate, comprising:

a plurality of selection lines, each selection line having a first end and a second end;

a plurality of signal lines;

a switching device connected to each of the selection lines and the signal lines;

a pixel electrode connected to an end of each switching device;

a plurality of first switching devices interposed near the first end between each of the adjacent selection lines, each of the first switching devices belonging to one of a first group and a second group, the adjacent switching devices belonging to different groups, and the switching devices belonging to the groups being switched on/off in units of each group;

a plurality of second switching devices interposed near the second end between each of the adjacent selection lines, each of the switching devices belonging to one of a third group and a fourth group, the adjacent switching devices belonging to different groups, and the switching devices belonging to the groups being switched on/off in units of each group;

a first selection line driving circuit that drives each of the selection lines, the first selection line driving circuit allowing a current to pass through pairs of selection lines connected in series via the first switching devices or applying a voltage to the pairs of wires; and a second selection line driving circuit driving each of the selection lines, the second selection line driving circuit allowing a current to pass through pairs of selection lines connected in series via the second switching devices or applying a voltage to the pairs of wires.

7. An electro-optical device substrate, comprising:
a plurality of wires formed by alternately arranging individual first wires and individual second wires which are parallel to the first wires;
a plurality of switching devices interposed between each of the first wires and each of the second wires which are adjacent to each of the first wires at one side; and
a power-supply that allows a current to pass through pairs of wires connected in series via each of the switching devices or that applies a voltage to the pairs of wires.

8. A method for inspecting an electro-optical device substrate including a plurality of wires and a plurality of switching devices interposed between each pair of the adjacent parallel wires, and a shift register for serially shifting data supplied to the each pair of the wires, and dividing the switching devices into a first group and a second group to be one of switching devices interposed between a first wire and adjacent one wire and another one of the adjacent switching devices interposed between the first wire and adjacent another wire belongs to different groups, the method comprising:
a first wire inspection step of switching on the switching devices belonging to the first group and allowing a current to pass through the each pair of the wires connected in series via the switching devices switched on or applying a voltage to the first wire of the each pair of the wires, and allowing a current to pass through the each pair of the wires connected in series via the switching devices switched on or applying a voltage to the first wire of the each pair of the wires based on the data which is shifted for serially by the shift register one after another, thus determining the presence of a defect in the each pair of the wires;
a second wire inspection step of switching on the switching devices belonging to the second group and allowing a current to pass through the each pair of the wires connected in series via the switching devices switched on or applying a voltage to the first wire of the each pair of the wires, and allowing a current to pass through the each pair of the wires connected in series via the switching devices switched on or applying a voltage to the first wire of the each pair of the wires based on the data which is shifted for serially by the shift register one after another, thus determining the presence of a defect in the each pair of the wires; and
a defect determining step of determining a defective wire based on the determination result of the first wire inspection step and the determination result of the second wire inspection step.

9. A method for inspecting an electro-optical device substrate including a plurality of wires, each wire having a first end and a second end, a plurality of first switching devices interposed near the first end between each of the adjacent parallel wires, a plurality of second switching devices interposed near the second end between each of the adjacent wires, a first power-supply connected to the first ends of the plurality of wires, and a second power-supply connected to the second ends of the plurality of wires, the method comprising:
dividing the plurality of first switching devices into a first group and a second group so that the adjacent first switching devices belong to different groups;
dividing the plurality of second switching devices into a third group and a fourth group so that the adjacent second switching devices belong to different groups;
performing one a first step and a second step, the first step including inspecting a first wire by switching on the switching devices belonging to the first group and allowing a current to pass through pairs of wires connected in series via the switching devices or by applying a voltage to the pairs of wires using the second power-supply, thus determining the presence of a defect in the pairs of wires, and a inspecting a second wire by switching on the switching devices belonging to the second group and allowing a current to pass through pairs of wires connected in series via the switching devices or by applying a voltage to the pairs of wires using the second power-supply, thus determining the presence of a defect in the pairs of wires;
the second step including inspecting a first wire by switching on the switching devices belonging to the third group and allowing a current to pass through pairs of wires connected in series via the switching devices or by applying a voltage to the pairs of wires using the first power-supply, thus determining the presence of a defect in the pairs of wires, and inspecting a second wire by switching on the switching devices belonging to the fourth group and allowing a current to pass through pairs of wires connected in series via the switching devices or by applying a voltage to the pairs of wires using the first power-supply, thus determining the presence of a defect in the pairs of wires; and
determining a defective wire based on the determination result of the first wire inspection step and the determination result of the second wire inspection step.

10. The method for inspecting an electro-optical device substrate as set forth in claim 9, further comprising:
a determining step, prior to the inspection steps, of determining whether the first power-supply and the second power-supply function correctly.

11. The method for inspecting an electro-optical device substrate as set forth in claim 10, the first step being performed when it is determined by the determining step that the first power-supply is defective, the second step being performed when it is determined by the determining step that the second power-supply is defective.

12. The method for inspecting an electro-optical device substrate as set forth in claim 11, neither of the first step nor the second step being performed when it is determined by the determining step that both the first power-supply and the second power-supply are defective.

13. A method for inspecting an electro-optical device substrate including a plurality of wires formed by alternately arranging individual first wires and individual second wires and a plurality of switching devices interposed between each of the first wires and each of the second wires which are adjacent to each of the first wires at one side, the method comprising:
inspecting the wires by switching on the plurality of switching devices and allowing a current to pass through pairs of wires connected in series via the switching devices or by applying a voltage to the pairs of wires, thus determining the presence of a defect in the pairs of wires.

14. An electro-optical device substrate, comprising:
a plurality of wires formed by alternately arranging individual first wires and individual second wires which are parallel to the first wires; and
a shift register for serially shifting data supplied to the each pair of the wires,
a plurality of switching devices interposed between each of the first wires and each of the second wires adjacent to each of the first wires at one side, and a plurality of switching devices not interposed between each of the first wires and each of the second wires adjacent to each of the first wires at another side, and the electro-optical device substrate allowing a current to pass through the each pair of the wires connected in series via the switching devices switched on or applying a voltage to the first wire of the each pair of the wires, and allowing a current to pass through the each pair of the wires connected in series via the switching devices switched on or applying a voltage to the first wire of the each pair of the wires based on the data which is shifted for serially by the shift register one after another.

15. An electro-optical device substrate comprising:

a plurality of wires;

a plurality of switching devices interposed between each parallel pair of the wires, wherein the each pair of the wires comprising adjacent two wires, and one of the adjacent switching devices interposed between a first wire and adjacent one wire and another one of the adjacent switching devices interposed between the first wire and adjacent another wire; and a shift register for serially shifting data supplied to the each pair of the wires, the electro-optical device substrate switching on the switching devices interposed between one pair of the wires including a wire in which the shift register supply the data to the wire, and switching off the switching devices interposed between another pair of the wires including the wire, and allowing a current to pass through the each pair of the wires connected in series via the switching devices switched on or applying a voltage to the first wire of the each pair of the wires, and allowing a current to pass through the each pair of the wires connected in series via the switching devices switched on or applying a voltage to the first wire of the each pair of the wires based on the data which is shifted for serially by the shift register one after another.

16. A method for inspecting an electro-optical device substrate including a plurality of wires formed by alternately arranging individual first wires and individual second wires which are parallel to the first wires and a shift register for serially shifting data supplied to the each pair of the wires and a plurality of switching devices interposed between each of the first wires and each of the second wires which are adjacent to each of the first wires at one side, and a plurality of switching devices not interposed between each of the first wires and each of the second wires which are adjacent to each of the first wires at another side, said method comprising:

a switching step of switching on the switching devices; and a wire inspection step of allowing a current to pass through the each pair of the wires connected in series via the switching devices switched on or applying a voltage to the first wire of the each pair of the wires, and allowing a current to pass through the each pair of the wires connected in series via the switching devices switched on or applying a voltage to the first wire of the each pair of the wires based on the data which is shifted for serially by the shift register one after another, thus determining the presence of a defect in the each pair of the wires.

17. A method for inspecting an electro-optical device substrate including a plurality of wires and a plurality of switching devices interposed between each parallel pair of the wires, wherein the each pair of the wires comprising adjacent two wires, and one of the adjacent switching devices interposed between a first wire and adjacent one wire and another one of the adjacent switching devices interposed between the first wire and adjacent another wire and a shift register for serially shifting data supplied to the each pair of the wires, said method comprising:

a switching step of switching on the switching devices interposed between one pair of the wires including a wire in which the shift register supply the data to the wire, and switching off the switching devices interposed between another pair of the wires including the wire; and a wire inspection step of allowing a current to pass through the each pair of the wires connected in series via the switching devices switched on or applying a voltage to the first wire of the each pair of the wires, and allowing a current to pass through the each pair of the wires connected in series via the switching devices switched on or applying a voltage to the first wire of the each pair of the wires based on the data which is shifted for serially by the shift register one after another, thus determining the presence of a defect in the each pair of the wires.

* * * * *